US012060832B1

(12) United States Patent
Mohammed

(10) Patent No.: US 12,060,832 B1
(45) Date of Patent: Aug. 13, 2024

(54) AIRCRAFT ENGINE FLUID SYSTEM WITH SHUT-OFF VALVE

(71) Applicant: PRATT & WHITNEY CANADA CORP., Longueuil (CA)

(72) Inventor: Kashif Mohammed, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/184,755

(22) Filed: Mar. 16, 2023

(51) Int. Cl.
*F02C 7/25* (2006.01)
*F02C 7/06* (2006.01)

(52) U.S. Cl.
CPC .............. *F02C 7/25* (2013.01); *F02C 7/06* (2013.01); *F05D 2220/323* (2013.01)

(58) Field of Classification Search
CPC .............. F02C 7/25; F02C 7/06; B64D 37/32
See application file for complete search history.

(56) References Cited

U.S. PATENT DOCUMENTS

| 5,284,012 | A | 2/1994 | Laborie et al. | |
|---|---|---|---|---|
| 7,805,947 | B2* | 10/2010 | Moulebhar | F02C 7/32 |
| | | | | 60/39.163 |
| 9,404,424 | B2* | 8/2016 | Morawski | F02C 7/232 |
| 9,890,868 | B2* | 2/2018 | Diaz | F16K 31/002 |
| 10,563,639 | B2* | 2/2020 | Van Den Aker | F03G 7/065 |
| 10,898,743 | B2 | 1/2021 | Wright | |
| 11,788,427 | B2* | 10/2023 | Turcotte | F01D 25/18 |
| | | | | 60/39.08 |
| 2006/0260323 | A1* | 11/2006 | Moulebhar | F02C 6/08 |
| | | | | 60/793 |
| 2007/0186981 | A1* | 8/2007 | Fukushima | F16H 61/143 |
| | | | | 74/730.1 |
| 2010/0116465 | A1* | 5/2010 | Jainek | F28F 27/02 |
| | | | | 29/726 |
| 2010/0303616 | A1* | 12/2010 | Chir | F02C 6/08 |
| | | | | 415/178 |
| 2012/0090815 | A1* | 4/2012 | Cameron | F16K 31/002 |
| | | | | 251/337 |
| 2013/0055991 | A1* | 3/2013 | Browne | F02M 26/26 |
| | | | | 123/568.12 |

(Continued)

FOREIGN PATENT DOCUMENTS

| CN | 203439266 U | * | 2/2014 | |
|---|---|---|---|---|
| CN | 114635800 A | * | 6/2022 | ........... B01D 53/229 |

(Continued)

*Primary Examiner* — Craig Kim
(74) *Attorney, Agent, or Firm* — NORTON ROSE FULBRIGHT CANADA LLP

(57) ABSTRACT

An aircraft engine, has: a fluid system including a fluid circuit fluidly connecting a plurality of components to a source of a fluid, the fluid being flammable, a component of the plurality of components containing a volume of the fluid during normal operation; and a valve fluidly connected to the fluid circuit upstream of the component relative to a flow of the fluid towards the component, the valve having an open configuration fluidly connecting the source of the fluid to the component through the valve and a closed configuration in which the valve disconnects the source of the fluid from the component, the valve movable from the open configuration to the closed configuration in response to the component being subjected to a fire event.

20 Claims, 6 Drawing Sheets

(56) References Cited

U.S. PATENT DOCUMENTS

| | | | |
|---|---|---|---|
| 2015/0083367 A1* | 3/2015 | Diaz | F02K 3/115 |
| | | | 165/103 |
| 2016/0369694 A1* | 12/2016 | Faubert | F16K 3/26 |
| 2017/0037954 A1* | 2/2017 | Shiina | F28D 15/00 |
| 2017/0096910 A1* | 4/2017 | Raimarckers | B01D 19/02 |
| 2017/0175721 A1* | 6/2017 | Maruoka | F04B 49/20 |
| 2017/0356525 A1* | 12/2017 | Mitrovic | F02C 7/36 |
| 2018/0163966 A1* | 6/2018 | Jones | F02C 7/222 |
| 2018/0283283 A1 | 10/2018 | Manoukian | |
| 2019/0003608 A1* | 1/2019 | Skurkis | F16K 31/002 |
| 2023/0331333 A1* | 10/2023 | Ericksen | A61F 2/70 |

FOREIGN PATENT DOCUMENTS

| | | | | |
|---|---|---|---|---|
| CN | 116533856 A | * | 8/2023 | |
| DE | 10205518 | | 9/2002 | |
| EP | 2649422 B1 | * | 10/2023 | G01N 21/4738 |

* cited by examiner

AIRCRAFT ENGINE FLUID SYSTEM WITH SHUT-OFF VALVE

TECHNICAL FIELD

The application relates generally to aircraft engines and to fluid systems of such engines and, more particularly, to systems and methods of operating these components for compliance with fire safety regulations.

BACKGROUND

Aircraft components may be certified as fire resistant or fireproof. According to airworthiness regulations, fire resistance requires the component to operate in a fire condition for five minutes while fireproof requires the component to comply with the fire resistance requirement and then to not leak a hazardous amount of a flammable fluid for an additional ten minutes. Making a component fireproof as opposed to fire resistant leads to increased cost, size, weight, and complexity. It may therefore be desirable to find ways to allow the use of a fire resistant component as opposed to a fireproof version of this same component.

SUMMARY

In a first aspect, there is provided an aircraft engine, comprising: a fluid system including a fluid circuit fluidly connecting a plurality of components to a source of a fluid, the fluid being flammable, a component of the plurality of components containing a volume of the fluid during normal operation; and a valve fluidly connected to the fluid circuit upstream of the component relative to a flow of the fluid towards the component, the valve having an open configuration fluidly connecting the source of the fluid to the component through the valve and a closed configuration in which the valve disconnects the source of the fluid from the component, the valve movable from the open configuration to the closed configuration in response to the component being subjected to a fire event.

The aircraft engine may include any of the following features, in any combinations.

In some embodiments, the valve includes a valve member engaged by a deformable member, the deformable member having a first shape and a second shape different than the first shape, the valve being in the open configuration when the deformable member is in the first shape and being in the closed configuration when the deformable member is in the second shape.

In some embodiments, a length of the deformable member varies from the first shape to the second shape.

In some embodiments, the length is greater in the second shape than in the first shape.

In some embodiments, the deformable member biases the valve member against a valve seat in the second shape and maintains a gap between the valve member and the valve seat in the first shape.

In some embodiments, the deformable member includes a shape-memory alloy, the valve being proximate to the component.

In some embodiments, the deformable member is a rod helicoidally wounded about a longitudinal axis is in-line with a line of the fluid circuit, the deformable member in contact with the fluid.

In some embodiments, a force required to move the deformable member between the first shape and the second shape is greater than a pressure of the fluid times a surface area of a projection of the valve member on a plane normal to the longitudinal axis.

In some embodiments, a low-pressure shaft is drivingly engaged to a load, the low-pressure shaft drivingly engaged to a pump in fluid communication with the fluid circuit, a drive path from the load to the pump, the drive path devoid of a clutch between the load and the pump.

In some embodiments, the component is an actuator.

In another aspect, there is provided a method of stopping a flow of a fluid to a component of a fluid system of an aircraft engine, the fluid being flammable, the method comprising: permitting fluid communication from a source of the fluid to the component through a valve located upstream of the component, the component containing a volume of the fluid during normal operation; and upon the component being exposed to a fire event, blocking fluid communication from the source of the fluid to the component by closing the valve.

The method described above may include any of the following features, in any combinations.

In some embodiments, the valve includes a valve member engaged by a deformable member, the deformable member having a first shape in which the valve member is distanced from a valve seat and a second shape different than the first shape and in which the valve member is biased against the valve seat, the blocking of the fluid communication from the fluid source to the component includes deforming the deformable member with heat of the fluid from the first shape to the second shape.

In some embodiments, the deforming of the deformable member includes varying a length of the deformable member with the heat of the fluid.

In some embodiments, the varying of the length includes increasing the length.

In some embodiments, the deformable member is a rod helicoidally-wounded about a longitudinal axis, the rod made of a shape-memory alloy.

In some embodiments, the permitting of the fluid communication from the fluid source to the component includes flowing the fluid around the valve member.

In some embodiments, the method includes shutting down the aircraft engine and allowing a propeller of the aircraft engine to rotate by wind milling.

In some embodiments, the blocking of the fluid communication from the fluid source to the component with the valve includes resisting a pressure of the fluid driven by a pump drivingly engaged by the propeller.

In some embodiments, the blocking of the fluid communication from the fluid source to the component with the valve in response to the component being subjected to the fire event includes closing the valve when a temperature of the fluid is above a predetermined temperature, the predetermined temperate being above a maximal operating temperature of the fluid.

In some embodiments, the fluid is oil.

DESCRIPTION OF THE DRAWINGS

Reference is now made to the accompanying figures in which.

DETAILED DESCRIPTION

Figure 1:
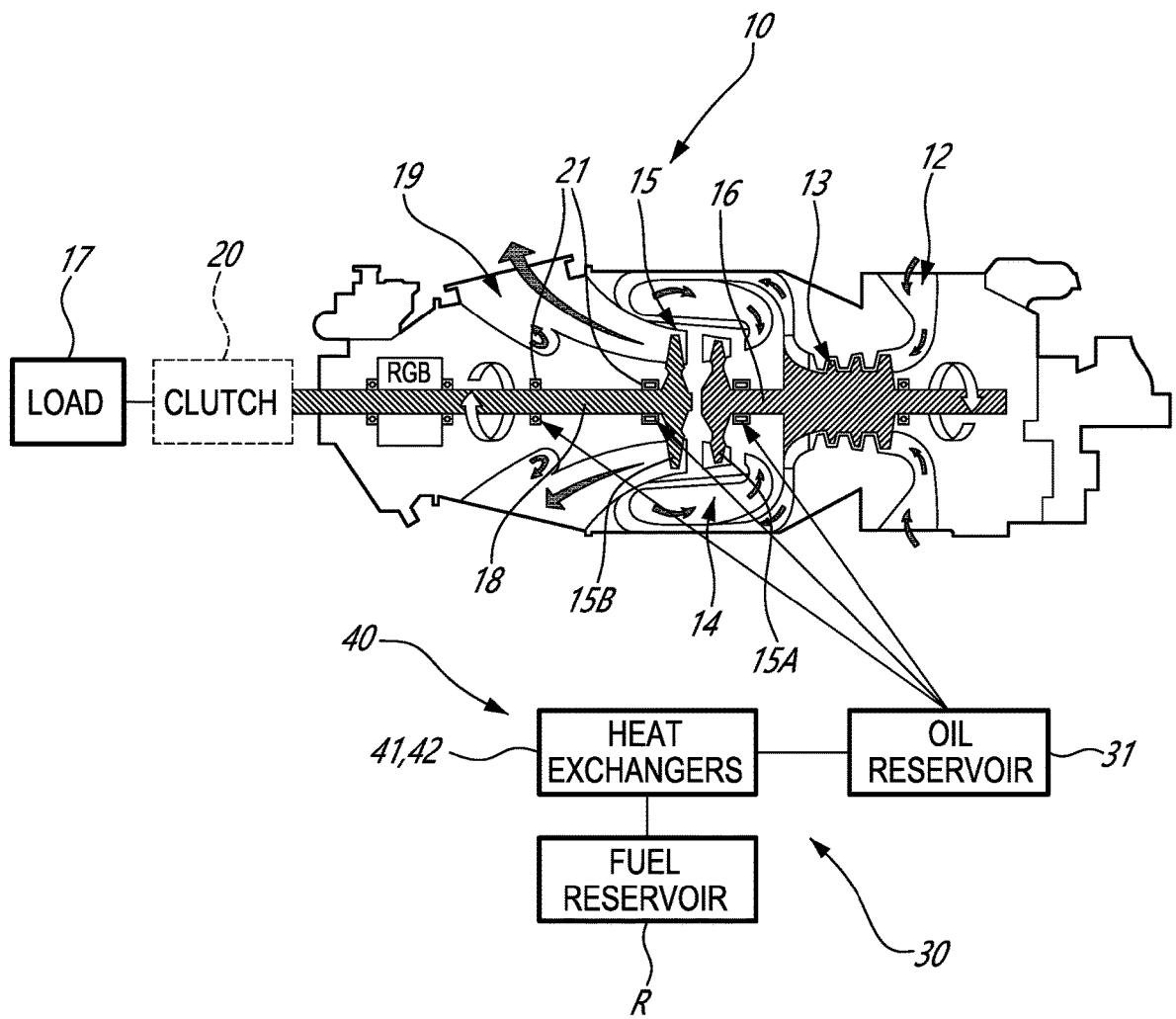
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication an inlet 12 for receiving air, a compressor section 13 for compressing the air received via the inlet 12, a combustor 14 for mixing fuel with the compressed air and for generating an annular stream of combustion gases. A turbine section 15 receiving the combustion gases from the combustor 14. The turbine section 15 has a high-pressure turbine 15A drivingly engaged to the compressor section 13 via a high-pressure shaft 16. The turbine section 15 further has a power or low-pressure turbine 15B downstream of the high-pressure turbine 15A and drivingly engaged to a load 17, which may be a propeller, a helicopter rotor, and so on, via a low-pressure shaft 18. The low-pressure shaft 18 may be directly engaged to the load or, as shown herein, drivingly engaged to the load 17 via a reduction gearbox RGB. The gas turbine engine 10 has an exhaust 19 for expelling the combustion gases. Although the depicted gas turbine engine 10 is a turboprop or turboshaft engine, the present disclosure may apply to other engines, such as auxiliary power units (APU) and turbofans. In an alternate embodiment, the compressor section may include a high-pressure compressor drivingly engaged to the high-pressure turbine 15A via the high-pressure shaft 16 and a low-pressure compressor drivingly engaged to the low-pressure turbine 15B via the low-pressure shaft 18. In the embodiment shown, the load 17 is drivingly engaged to the low-pressure shaft 18 via a clutch 20 that has engaged and disengaged configurations to selectively disengage the load 17 from the low-pressure shaft 18. In the case of a turboshaft application, this clutch 20 may allow the disengagement of a helicopter rotor from the low-pressure shaft 18. In some applications, such as a turboprop, the clutch 20 may be omitted.

The low-pressure shaft 18 and the high-pressure shaft 16 are rollingly supported by bearings 21. Typically, the bearings 21 are contained within bearing cavities 22 (FIG. 2) that may be hydraulically connected to an oil source to receive oil for lubrication. An oil system 30 is provided for circulating oil to the bearings 26 and back to an oil source 31 (e.g., oil tank). The oil flowing through the oil system 30 is expected to see its temperature increase during use. It may therefore be required to cool down the oil. This may be done in many ways, for example, by transferring heat to ambient air of an environment outside the gas turbine engine 10 and/or to another fluid, such as the fuel.

In the embodiment shown, the gas turbine engine 10 has a heat exchange system 40 that is used to exchange heat between different fluids for proper operation of the gas turbine engine 10. In the present case, the heat exchange system 40 includes a first heat exchanger 41, which may be referred to as a air-cooled oil cooler (ACOC) used to transfer heat from the oil to the environment outside the gas turbine engine 10. The heat exchange system 40 further includes a second heat exchanger 42, which may be referred to as a fuel-oil heat exchanger (FOHE), used for transferring heat from the oil of the oil system 30 to fuel flowing from a fuel reservoir R, or any other fuel source, to the combustor 14 of the gas turbine engine 10 for combustion. Pre-heating the fuel as such may increase efficiency of the combustion of the fuel and may cool down the oil that heats up while lubricating the bearings 21. In some cases, the first heat exchanger 41 may be used to transfer or extract heat to/from an aircraft system in need.

Figure 2:
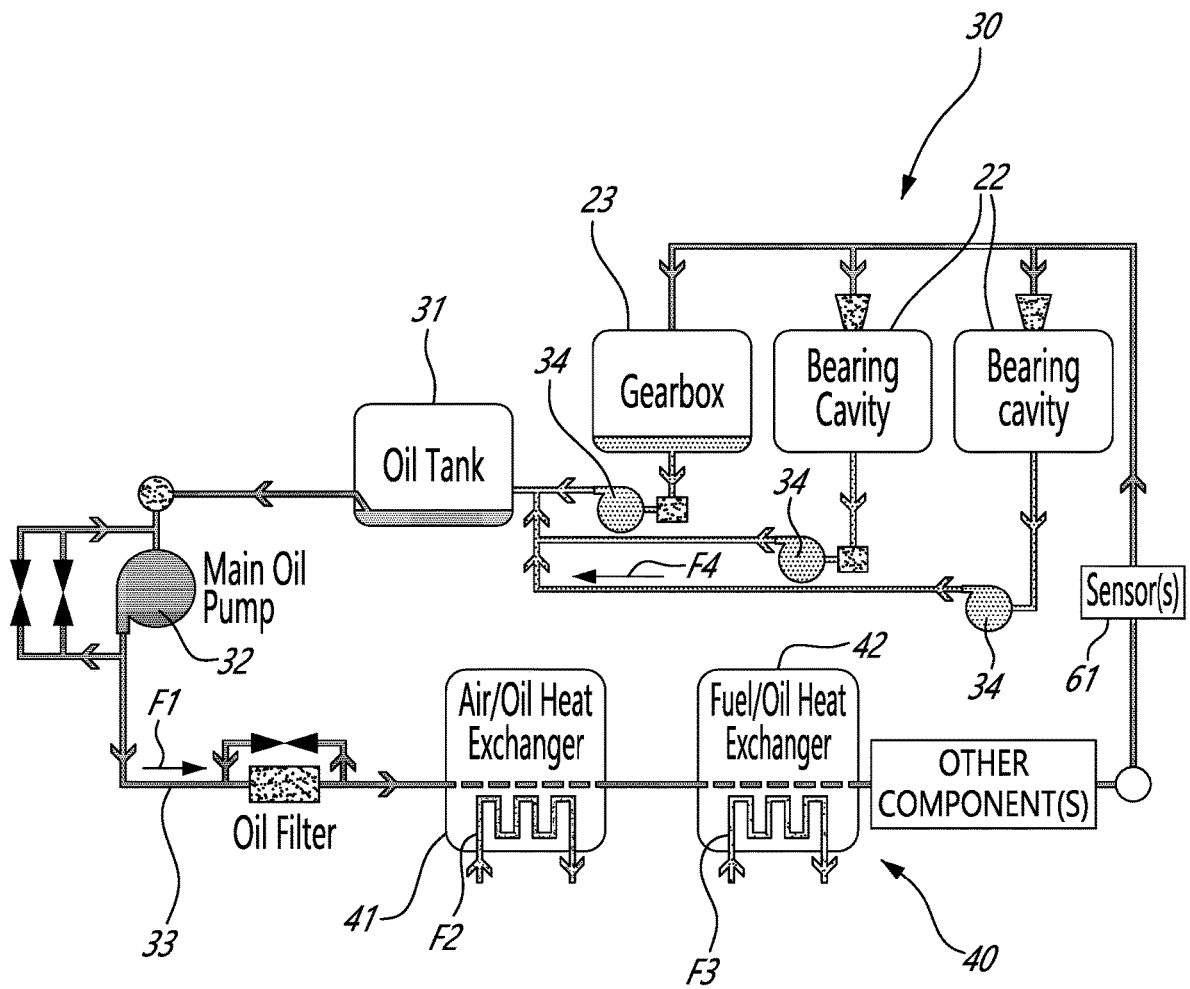
FIG. 2 is a schematic view of a fluid system, depicted as an oil system, for the aircraft engine of FIG. 1.

Referring to FIG. 2, the oil system 30 and the heat exchange system 40 are shown in greater detail. The oil system 30 includes an oil circuit 33, which typically includes one or more lines to flow the oil, an oil pump 32 that drives an oil flow F1 within an oil conduit of the oil circuit 33 from the oil source 31. The oil system 30 may be a pressure regulated system in which a pressure regulating valve may be connected in parallel to the oil pump 32. The oil flow F1 exchanges heat with an airflow F2 from the environment through the first heat exchanger 41 and exchanges heat with a fuel flow F3 through the second heat exchanger 42. The oil flow F1 is then distributed between different components in need of oil. These components may include, for instance, one or more bearing cavity(ies) 22, a generator, an actuator, and/or a gearbox 23, which may correspond to the reduction gearbox of FIG. 1 or any other gearbox of the engine, in some embodiments. Used oil is then scavenged and scavenge pumps 34 drive a scavenge oil flow F4 from scavenge outlets of the bearing cavities 22 and the gearbox 23 back to the oil source 31 where the oil may be flown back to the oil pump 32. Typically, the oil tank has a volume devoid of oil (e.g., empty space containing air). During lubrication, the oil is expected to be mixed with air. Thus, the scavenge oil flow F4 is a multi-phase fluid containing oil and air. The oil may rest some time in the oil tank before being drawn by the pump 32. During this time, the air contained in the oil may naturally separate. A de-oiler and/or de-aerator may be used to accelerate the removal of air from the scavenge oil flow F4. It will be appreciated that many other configurations of the oil system 30 are contemplated. For instance, a different number of scavenge pumps may be used, some components may be omitted, and so on. An actuator may be fluidly connected to the oil conduit and may rely on oil pressure for its operation.

Aircraft engine components, such as the first heat exchanger 41 (i.e., ACOC), the second heat exchanger 42 (i.e., FOHE), other component(s) 35, the oil pump 32, the scavenge pump 34, the gearbox 23, and so on, may be required to be certified as either fire resistant or fireproof. The other component(s) 35 may include, for instance, a generator, a gearbox, an actuator, and so on. To be certified as fire resistant, the component needs to operate in a fire condition for five minutes. To be certified as fireproof, the component needs to meet fire resistant requirements and, in addition, not leak a hazardous amount of flammable fluid (e.g., oil, fuel) for an additional 10 minutes. Typically, an amount of flammable fluid is considered hazardous if it exceeds 250 millilitres. This volume may however change depending of the regulatory body.

In the context of the present disclosure, the fire proof and fire resistance requirements are in reference with Federal Aviation Administration (FAA) regulations. These requirements may vary depending on regulations of the countries in which the aircraft engine will be operated. In some cases, the fire proof and fire resistant regulations are defined by Article 533.17 of the Airworthiness Manual Chapter 533 of the Canadian Aviation Regulations (CARs). The "fireproof" and "fire resistant" definitions are in conformance with the requirements set by a national or international regulatory body, for example, the Federal Aviation Administration, the European Aviation Safety Agency, the Civil Aviation Administration of China, the Japan Civil Aviation Bureau, or the Russian Federal Agency for Air Transport to name a few.

If a fire event is detected, the gas turbine engine 10 may be shut down. However, for some applications such as for a turboprop, it may not be possible to disengage the load 17, which may correspond to a propeller. Thus, even if the gas turbine engine 10 is shut down after a fire event, the load 17 may continue to drive some engine components such as the pump 32. In other words, in some applications, a drive path from the propeller to the pump 32 may be devoid of the clutch. Consequently, even after shut down of the gas turbine engine 10, an oil flow may continue to be supplied to other components of the oil system 30. One or more of these other components may be exposed to a fire and may be required to comply only with fire resistance requirements since they contain a baseline volume of oil that is less than a maximum volume of oil per resistance requirements. However, this or these components may be required to be fire proof because of the oil that is continuously supplied to them via the pump 32 driven by wind milling of the propeller even after shut down of the gas turbine engine 10.

The present disclosure describes a method of stopping a flow of oil or other fluid (e.g., fuel) to a component even if an oil flow (or fuel flow) is still generated because of the wind milling of the propeller so that the component may only be required to satisfy fire resistance requirements rather than fire proof requirements.

Figure 3:
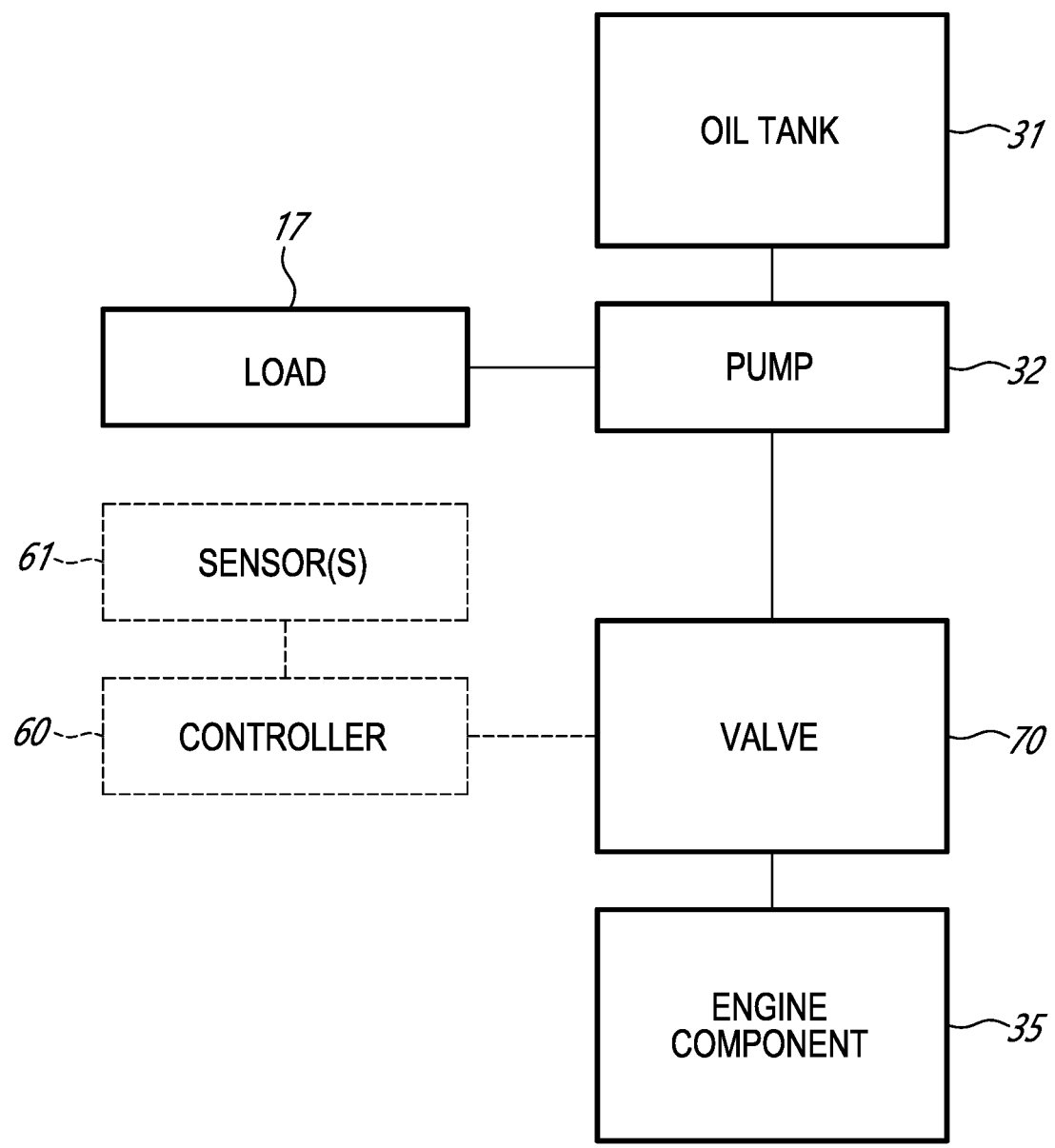
FIG. 3 is an enlarged view of a portion of the oil system of the aircraft engine of FIG. 1.

Referring now to FIG. 3, an engine component is shown at 35. The engine component 35 may be an actuator, a generator, and so on as detailed above. Typically, the engine component 35 is any component containing a baseline volume of oil during normal operation. The engine component 35 may require oil or another fluid for its operation. For instance, in the case of an actuator, the component relies on a pressure of the fluid for its operation. For a gearbox, the component relies on oil for lubrication. The engine component 35 may exclude a fuel nozzle whose function is merely to inject fuel into the combustor 14 of the gas turbine engine 10. The baseline volume of oil is less than a maximum volume of the oil for compliance with fire resistance requirements. In other words, the baseline volume of oil is less than a volume threshold requiring the component 35 to be certified as a fireproof component. Also, FIG. 3 pertains to an engine component of the oil system 30. However, the principles of the present disclosure are applicable to any fluid system of the gas turbine engine 10, such as a fuel system.

In the embodiment shown, the engine component 35 is fluidly connected to the oil source 31 via the oil circuit 33. As shown, the pump 32 draws oil from the oil source 31 and supplies this oil to the engine component 35. A valve 70 is hydraulically connected to the oil circuit 33 upstream of and proximate the engine component 35. Herein, the expression "proximate" implies that the valve 70 is close enough to the engine component 35 so that both of the valve 70 and the engine component 35 may be exposed to increased temperature in a fire event. A distance between the valve 70 and the engine component 35 may be a few inches. In some configurations, such as if the valve is an actuated valve as will be described below, the valve 70 need not be proximate the engine component 35.

Figure 4A:
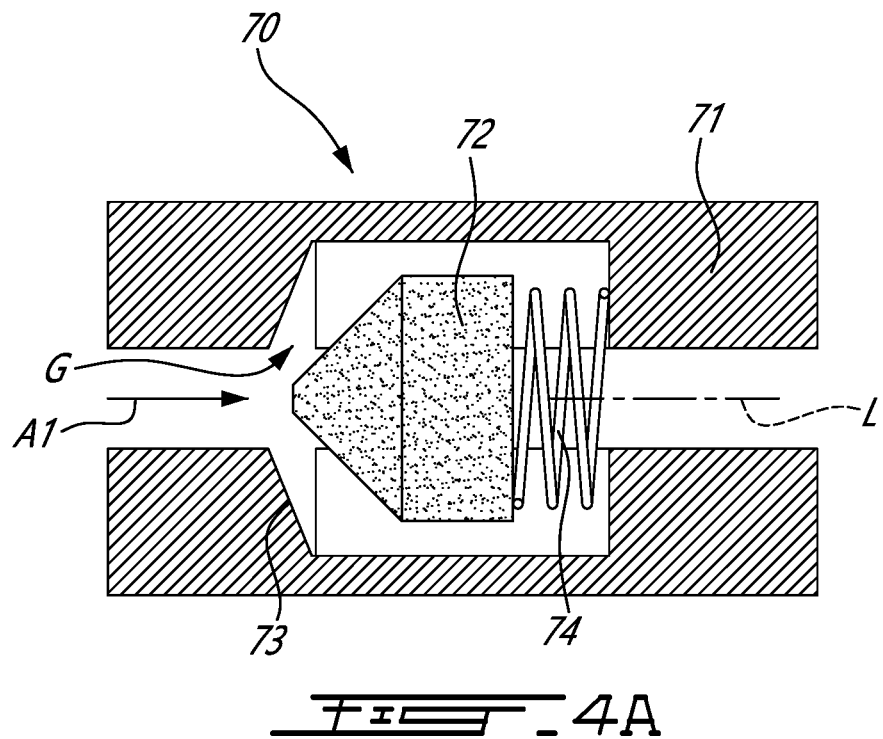
FIG. 4A is a cross-sectional view of a valve of the oil system of FIG. 2, the valve illustrated in an open configuration.
Figure 4B:
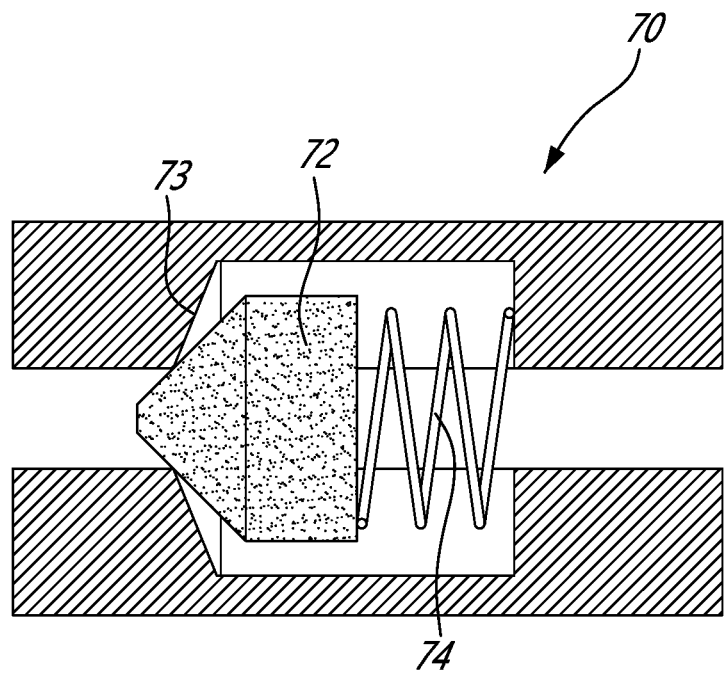
FIG. 4B is another cross-sectional view of the valve of FIG. 4A illustrated in a closed configuration.

Referring now to FIGS. 4A and 4B, the valve 70 is shown in an open configuration in FIG. 4A and in a closed configuration in FIG. 4B. A direction of the oil flow through the valve 70 is depicted with arrow A1. In the open configuration of FIG. 4A, the valve 70 fluidly connects the oil source 31 to the engine component 35 through the valve 70. In the closed configuration of FIG. 4B, the valve 70 disconnects the oil source 31 from the engine component 35. The valve 70 moves from the open configuration to the closed configuration when exposed to a temperature above a predetermined temperature of the oil. The predetermined temperature is above a maximum operating temperature of the oil such that the valve 70 does not block the oil flow unless there is a fire event. In other words, the valve 70 moves from the open configuration to the closed configuration in response to the engine component 35 being subjected to a fire event.

When the valve is a passive valve, it closes when the component is subjected to a fire event. A fire event is expected to increase a temperature of ambient air around the component and/or around the valve 70. In some cases, the increase in temperature of the ambient air around the component may result in an increase of the temperature of the oil flowing through the component. This heated oil may reach the valve 70 thereby triggering its closing. In some other cases, ambient air around heated by the fire in the vicinity of the valve may be sufficient to trigger the closing of the valve. The valve may therefore be tuned to close when a temperature of either the oil flowing through the system or the ambient air around the valve reaches a given temperature threshold that is above a maximum normal operating temperature of the ambient air or of the oil.

The valve 70 includes a housing 71 that contains a valve member 72, a valve seat 73 herein defined by the housing 71, and a deformable member engaged to the housing 71 and to the valve member 72. The deformable member 74 has a first shape depicted in FIG. 4A and a second shape depicted in FIG. 4B. The second shape is different than the first shape. The valve 70 is in the open configuration when the deformable member 74 is in the first shape and is in the closed configuration when the deformable member 74 is in the second shape. In the present embodiment, a length of the deformable member 74 varies from the first shape to the second shape. Herein, the length is greater in the second shape than in the first shape. The deformable member 74 thus biases the valve member 72 against the valve seat 73 in the second shape and maintains a gap G between the valve member 72 and the valve seat 73 in the first shape.

A default shape of the deformable member 74 may be the second shape depicted in FIG. 4B. The deformable member 74 may thus be deformed by compression from the second shape to the first shape of FIG. 4A. The deformable member 74 may retain this deformed shape of FIG. 4A until it is exposed to a temperature above a given threshold. At which point, the deformable member 74 would deform back towards its original shape of FIG. 4B.

In the disclosed embodiment, the deformable member 74 is a rod helicoidally-wounded about a longitudinal axis L, which is in-line with a line of the oil circuit 33. By being in-line with the line of the oil circuit 33, the deformable member 74 is "wetted" or exposed to the oil. It may be in contact with the oil. This may allow the deformable member 74 to react more quickly to an increase of a temperature of the oil. The rod is made of a shape-memory alloy. A shape-memory alloy (SMA) is an alloy that may be deformed when cold, but returns to its pre-deformed ("re-membered") shape when heated. It may also be called memory metal, memory alloy, smart metal, smart alloy, or muscle wire. The shape-memory alloy may include, for instance, copper-aluminum-nickel, nickel-titanium, zinc-copper-gold-iron, or any other suitable alloys and combinations thereof. The deformable member 74 may be plastically deformed in a compressed state. Upon being exposed to a temperate above a given threshold, the deformable member 74 will return to it's natural expanded state to close the valve 70.

The deformable member may have other shapes, such as staked disk (e.g., Belleville washer), leaf spring, wave spring, etc. Any suitable shapes allowing the deformable member to change length when exposed to a temperature variation is contemplated.

A force required to move the deformable member 74 between the first shape and the second shape is greater than a pressure of the oil times a surface area of a projection of the valve member 72 on a plane normal to the longitudinal axis L. In other words, the deformable member 74 is sufficiently stiff to avoid the oil pressure from moving the valve member 72. This may avoid the oil pressure from closing the valve 70 in normal operation when there is no fire event and may ensure that the deformable member 74 is strong enough to fight the pressure to open the valve 70 to avoid any oil from flowing through the valve 70 during a fire event.

Referring back to FIG. 3, in another embodiment, the valve 70 is an actuated valve (e.g., servo valve) operatively connected to a controller 60 operable to control the opening and closing of the valve 70. One or more sensor(s) 61 is operatively connected to the controller 60. The controller 60 may be configured for receiving a signal indicative of a fire event; and moving the actuated valve from the open configuration to the closed configuration. The receiving of the signal indicative of the fire event may include receiving the signal from the one or more sensor(s) 61. The signal may be indicative that a temperature proximate or within the engine component 35 is above a temperature threshold. The temperature threshold is set to be higher than a maximum operational temperature of the oil flowing through the engine component 35 and/or higher than a maximum temperature of ambient air around the engine component 35 such that the only reason for the temperature to reach this temperature threshold would be because of a fire event.

The one or more sensor(s) 61 may alternatively, or in combination, includes a pressure sensor, a smoke sensor, or any other sensor that may be used to detect a fire. In some embodiments, the sensor is operable to measure an operating parameter of the engine component 35 and to send a signal to the controller 60 should a value of this operating parameter exceeds a parameter threshold. The operating parameter may be the temperature of the oil, the temperature of ambient air around the engine component 35, the pressure of the oil inside the engine component 35, and so on. The one or more sensor(s) 61 and the controller 60 may be part of a fire detection system of the gas turbine engine 10.

In some embodiments, the controller 60 may be further configured to receive a second signal indicative that the gas turbine engine 10 is shut down to avoid closing the oil supply to the engine component 35 if the engine is still operating. Thus, the moving of the actuated valve to the closed configuration may be performed after the receiving of this second signal. The one or more sensor(s) 61 may thus include a sensor able to generate a signal indicative of whether or not the gas turbine engine 10 is operating. This sensor may be a speed sensor operatively connected to a shaft of the gas turbine engine 10. The gas turbine engine 10 may be considered shut down if a speed of the shaft measured by the speed sensor is below or at a certain value.

Alternatively, a temperature sensor operatively connected to the combustor 14 (FIG. 1) may be used. The gas turbine engine 10 may be considered shut down if a temperature within the combustor 14 is below a given threshold.

Figure 5:
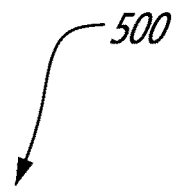
FIG. 5 is a flowchart illustrating steps of a method for stopping a flow to an engine component of the oil system of FIG. 2.

Referring now to FIG. 5, a method of stopping an oil flow to the engine component 35 is shown at 500. The method 500 below is described using oil as the fluid, but may be applicable to any component using any other flammable fluid, such as fuel.

The method 500 includes permitting fluid communication from the oil source 31 to the engine component 35 through the valve 70 located upstream of the engine component 35 at 502; and blocking fluid communication from the oil source 31 to the engine component 35 with the valve 70 in response to the engine component 35 being subjected to a fire event at 504.

In the embodiment shown, the blocking of the fluid communication from the oil source 31 to the engine component 35 at 504 includes deforming the deformable member 74 with heat of the oil from the first shape to the second shape. This herein includes varying a length of the deformable member 74 with the heat of the oil. In the present embodiment, the varying of the length includes increasing the length.

Since the valve member 72 is in-line with a line of the oil circuit 33, the permitting of the fluid communication from the oil source 31 to the engine component 35 at 502 includes flowing the oil around the valve member 72.

The blocking of the fluid communication with the valve 70 in response to the component being subjected to the fire event may include closing the valve 70 when a temperature of the oil is above a predetermined temperature. This predetermined temperate is above a maximal operating temperature of the oil.

The method 500 includes shutting down the gas turbine engine 10 and allowing a propeller to rotate by wind milling. The blocking of the fluid communication from the oil source 31 to the engine component 35 with the valve 70 includes resisting a pressure of the oil driven by the pump 32 drivingly engaged by the propeller.

The present disclosure provides a means to shutoff flammable fluid flow to a component on an engine via thermal shutoff valve. This may allow windmill flow to a component to be shut-off, thereby allowing a downgrade from fire proof to fire resistant. This may make compliance demonstration simpler and more likely without overdesigning the part.

The present disclosure proposes to use an SMA spring (or any other embodiment of a shape/configuration that may be crush and come back to an original expanded size) that has an original sized to push a valve to a closed position, then the "spring" is compressed to a smaller size whereby it allows fluid flow during normal operation. Then the fire event heats the "spring" enough that said spring reverts back to it's original expanded size and thereby pushes the valve cap/piston to shutoff the fluid flow.

Figure 6:
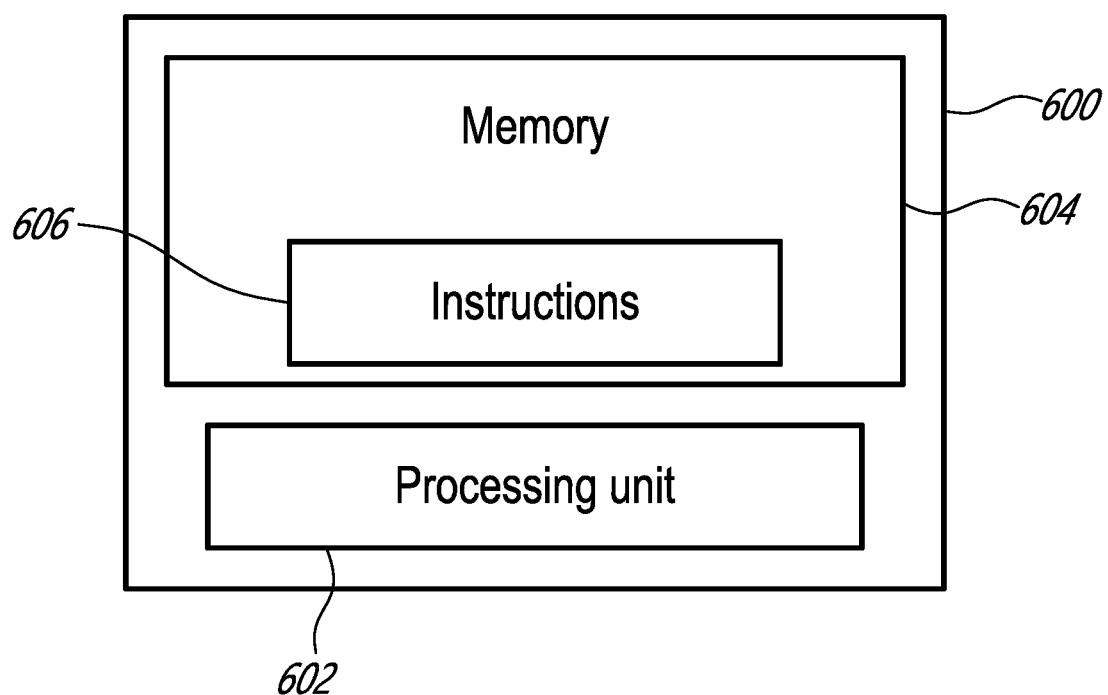
FIG. 6 is a schematic representation of a controller of the aircraft engine of FIG. 1.

With reference to FIG. 6, an example of a computing device 600 is illustrated. For simplicity only one computing device 600 is shown but the system may include more computing devices 600 operable to exchange data. The computing devices 600 may be the same or different types of devices. The controller 60 may be implemented with one or more computing devices 600. Note that the controller 60 can be implemented as part of a full-authority digital engine controls (FADEC) or other similar device, including electronic engine control (EEC), engine control unit (ECU), electronic propeller control, propeller control unit, and the like. In some embodiments, the controller 60 is implemented as a Flight Data Acquisition Storage and Transmission system, such as a FAST™ system. The controller may be implemented in part in the FAST™ system and in part in the EEC. Other embodiments may also apply.

The computing device 600 comprises a processing unit 602 and a memory 604 which has stored therein computer-executable instructions 606. The processing unit 602 may comprise any suitable devices configured to implement the method 500 such that instructions 606, when executed by the computing device 600 or other programmable apparatus, may cause the functions/acts/steps performed as part of the method 500 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for stopping the oil flow to the component described herein may be implemented in a high level procedural or object oriented programming or scripting language, or a combination thereof, to communicate with or assist in the operation of a computer system, for example the computing device 600. Alternatively, the methods and systems for stopping the oil flow to the component may be implemented in assembly or machine language. The language may be a compiled or interpreted language. Program code for implementing the methods and systems for stopping the oil flow to the component may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for stopping the oil flow to the component may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
    a fluid system including a fluid circuit fluidly connecting a plurality of components to a source of a fluid, the fluid being flammable, a component of the plurality of components containing a volume of the fluid during normal operation; and
    a valve fluidly connected to the fluid circuit upstream of the component relative to a flow of the fluid towards the component, the valve having a valve inlet, a valve outlet, and a housing defining a valve seat located between the valve inlet and the valve outlet, the valve having a valve member and a deformable member engaged to the valve member, the valve having an open configuration in which the valve member is offset from the valve seat and in which the source of the fluid is fluidly connected to the component through the valve and a closed configuration in which the valve member abuts the valve seat and in which the valve disconnects the source of the fluid from the component, the valve movable from the open configuration to the closed configuration in response to the component being subjected to a fire event, wherein the deformable member is in contact with the fluid, a shape of the deformable member being variable with a temperature variation of the fluid, the deformable member biasing the valve member against the valve seat to position the valve in the closed configuration when exposed to the fluid at a temperature above a temperature threshold.

2. The aircraft engine of claim 1, wherein the deformable member has a first shape and a second shape different than the first shape, the valve being in the open configuration when the deformable member is in the first shape and being in the closed configuration when the deformable member is in the second shape.

3. The aircraft engine of claim 2, wherein a length of the deformable member varies from the first shape to the second shape.

4. The aircraft engine of claim 3, wherein the length is greater in the second shape than in the first shape.

5. The aircraft engine of claim 2, wherein the deformable member biases the valve member against the valve seat in the second shape and maintains a gap between the valve member and the valve seat in the first shape.

6. The aircraft engine of claim 2, wherein the deformable member includes a shape-memory alloy, the valve being proximate to the component.

7. The aircraft engine of claim 6, wherein the deformable member is a rod helicoidally wounded about a longitudinal axis, the deformable member and the longitudinal axis being in-line with a line of the fluid circuit.

8. The aircraft engine of claim 7, wherein a force required to move the deformable member between the first shape and the second shape is greater than a pressure of the fluid times a surface area of a projection of the valve member on a plane normal to the longitudinal axis.

9. The aircraft engine of claim 1, comprising a low-pressure shaft drivingly engaged to a load, the low-pressure shaft drivingly engaged to a pump in fluid communication with the fluid circuit, a drive path from the load to the pump, the drive path devoid of a clutch between the load and the pump.

10. The aircraft engine of claim 9, wherein the component is an actuator.

11. A method of stopping a flow of a fluid to a component of a fluid system of an aircraft engine, the fluid being flammable, the method comprising:

permitting fluid communication from a source of the fluid to the component through a valve located upstream of the component, the component containing a volume of the fluid during normal operation, the valve having a valve inlet, a valve outlet, and a housing defining a valve seat located between the valve inlet and the valve outlet, the valve having a valve member and a deformable member engaged to the valve member; and upon the component being exposed to a fire event, blocking fluid communication from the source of the fluid to the component by closing the valve, the closing of the valve including contacting the deformable member with the fluid to deform the deformable member with heat of the fluid thereby biasing the valve member against the valve seat.

12. The method of claim 11, wherein the deformable member has a first shape in which the valve member is distanced from the valve seat and a second shape different than the first shape and in which the valve member is biased against the valve seat, the blocking of the fluid communication from the fluid source to the component includes deforming the deformable member with heat of the fluid from the first shape to the second shape.

13. The method of claim 12, wherein the deforming of the deformable member includes varying a length of the deformable member with the heat of the fluid.

14. The method of claim 13, wherein the varying of the length includes increasing the length.

15. The method of claim 12, wherein the deformable member is a rod helicoidally-wounded about a longitudinal axis, the rod made of a shape-memory alloy.

16. The method of claim 15, wherein the permitting of the fluid communication from the fluid source to the component includes flowing the fluid around the valve member.

17. The method of claim 11, comprising shutting down the aircraft engine and allowing a propeller of the aircraft engine to rotate by wind milling.

18. The method of claim 17, wherein the blocking of the fluid communication from the fluid source to the component with the valve includes resisting a pressure of the fluid driven by a pump drivingly engaged by the propeller.

19. The method of claim 11, wherein the blocking of the fluid communication from the fluid source to the component with the valve in response to the component being subjected to the fire event includes closing the valve when a temperature of the fluid is above a predetermined temperature, the predetermined temperate being above a maximal operating temperature of the fluid.

20. The method of claim 11, wherein the fluid is oil.

* * * * *